US007890567B2

(12) United States Patent
Michl

(10) Patent No.: US 7,890,567 B2
(45) Date of Patent: Feb. 15, 2011

(54) METHOD FOR DETERMINING DEVIATIONS OF AN END-SYSTEM MESSAGE FROM A REFERENCE MESSAGE

(75) Inventor: Andreas Michl, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 723 days.

(21) Appl. No.: 10/550,949

(22) PCT Filed: Feb. 10, 2004

(86) PCT No.: PCT/EP2004/001225

§ 371 (c)(1),
(2), (4) Date: May 2, 2006

(87) PCT Pub. No.: WO2004/086224

PCT Pub. Date: Oct. 7, 2004

(65) Prior Publication Data

US 2007/0033527 A1  Feb. 8, 2007

(30) Foreign Application Priority Data

Mar. 27, 2003  (DE)  ................... 103 13 910

(51) Int. Cl.
*G06F 15/16* (2006.01)
(52) U.S. Cl. ...................... 709/200; 715/206
(58) Field of Classification Search ............ 709/200, 709/201, 202, 203
See application file for complete search history.

(56) References Cited

U.S. PATENT DOCUMENTS 5,289,474 A  2/1994  Purcell et al.
5,361,353 A  11/1994  Carr et al.
5,812,145 A  9/1998  Holzmann et al.

(Continued)

FOREIGN PATENT DOCUMENTS

CA  2255047  5/2000

(Continued)

OTHER PUBLICATIONS

Author(s): T. Tuma, I. Fajfar, M. Perko, F. Bratkovic, J. Puhan Title: A hands-on approach to teaching the basic OSI reference model Journal: International Journal of Electrical Engineering Education Publisher: Manchester University Press; vol. 37, Issue 2; Date: Apr. 2000; Pertinent pp. 157-166.*

(Continued)

*Primary Examiner*—Lashonda T Jacobs
*Assistant Examiner*—Marshall McLeod
(74) *Attorney, Agent, or Firm*—Ditthavong Mori & Steiner, P.C.

(57) ABSTRACT

A method is disclosed for determining deviations of a modular end-system message, generated in a hierarchically structured end-system of a telecommunications device, from a reference message. A reference message is read, and an end-system message generated in the end-system is read. A message-structure analysis is performed for the reference message and the end-system message. Any deviations of the end-system message from the reference message are determined from the message structure and structural units of the end-system message that deviate from the reference message are output.

9 Claims, 4 Drawing Sheets

U.S. PATENT DOCUMENTS 6,502,112 B1 12/2002 Baisley
6,848,078 B1 * 1/2005 Birsan et al. ................ 715/206

FOREIGN PATENT DOCUMENTS

| DE | 44 26 739 C2 | 1/1998 |
| DE | 693 28 784 T2 | 11/2000 |
| DE | 199 29 166 A1 | 3/2001 |
| DE | 01 39 068 A1 | 2/2003 |
| DE | 102 04 657 A1 | 8/2003 |
| EP | 0 589 576 A2 | 9/1993 |
| WO | WO 02/08890 A2 | 1/2002 |

OTHER PUBLICATIONS

EP, International Preliminary Report on Patentability.

* cited by examiner

METHOD FOR DETERMINING DEVIATIONS OF AN END-SYSTEM MESSAGE FROM A REFERENCE MESSAGE

FIELD OF THE INVENTION

The invention relates to a method for determining deviations of an end-system message of modular structure generated in a hierarchically-structured end system of a telecommunications device by comparison with a reference message.

BACKGROUND OF THE INVENTION

Published German patent application DE 101 39 068 A1 discloses that a sequence of commands for a hierarchically-structured command structure can be generated automatically. For this purpose, a complete set of possible commands is initially generated by storing all possible branches through the individual hierarchical levels as individual commands. Each individual command corresponds to a pathway from the highest to the lowest hierarchical level. The individual commands generated in this manner are then arranged in an arbitrary sequence, in which repetitions of an individual command may also occur.

This sequence of individual commands is then supplied, for example, to a measuring device, which processes the commands successively. If an error occurs in the system during the implementation of a processing run of this kind, the entire sequence of individual commands is systematically shortened in order to determine which chain of individual commands is causative of the system error. The sequence of individual commands is purely arbitrary, and the successively-processed commands are not causally connected. Accordingly, after a new development step of the measuring device, only a complete, new sequence of commands can be generated, within which, once again, a process of localization towards a possible critical sequence takes place.

With the system described, it is not therefore possible to determine the effects of a change to the system with regard to the structure of an individual command. An analysis of a message sent between the individual layers from an end system structured, for example, according to the OSI reference model, is therefore not possible, because messages of this kind are generated only on the basis of a preceding sequence of messages.

SUMMARY OF THE INVENTION

There exists a need to provide a method, in which deviations of end-system messages of modular structure generated in a hierarchically-structured end system of a telecommunications device can be determined by comparison with reference messages.

Deviations of an end-system message from a reference message are determined with the method according to the invention. The messages constructed in a modular manner provide a given structure. In order to determine the deviations of the end-system message, the reference message is first subjected to a message-structure analysis, in which the underlying structure of the reference message is analyzed.

A message-structure analysis is also carried out on the end-system message, for which the match with and/or deviation from the reference message is to be determined. Deviations of the individual structural units of the end-system message are therefore determined after the modular structure with all structural units has been established for both messages. In this context, such deviations can relate either to the pure content of a given structural unit, e.g. a parameter defined by a given alphanumerical value, or may relate to the general structure of the message. This is present, for example, if the subordinate structural units contained in a given structural unit are of a different type, from the subordinate structural units of the corresponding, given structural units of the reference message. The deviations of structural units of the end-system message from the reference message determined in this manner are finally displayed.

It is particularly advantageous in one embodiment to display those structural units contained in the end-system message and the reference message, which match alongside the structural units of the end-system message, which actually deviate from the reference message. In this context, matching structural units are those structural units, which are present in an identical form in the end-system message and the reference message, that is to say, which are both of the same type, which have the same content and are also arranged in a matching manner with regard to the structure of the message, wherein the message can also be a part of an overall message, which consists of at least one structural unit with all of the structural units subordinate to the this structural unit. The matching structural units and the mutually deviating structural units are presented in such a manner that they are graphically distinguishable from one another, so that, for a more accurate analysis of the deviations, the deviating structural unit is, on the one hand, immediately recognizable, and, on the other hand, the overall context of the deviating structural unit within the modular construction of the end-system message is also preserved.

Furthermore, it is advantageous, if those structural units of the reference message, which are not contained in the end-system message to be analysed analyzed are also presented alongside the matching and/or deviating structural units. For example, in the case of an end-system message generated in the end system of the telecommunications device and sent between the various levels according to the OSI reference model, if structural units, which are present in the reference message, are replaced by structural units of another type, this is once again immediately recognizable through a graphically distinguishable display. Starting from a test sequence read out according to a further development of the end system, it is therefore possible to investigate a given end-system message or a part thereof with regard to deviations, for example, by comparison with a reference message, wherein, for example, the reference message represents the anticipated message of the end system. The effects of changes to the end system can therefore be determined in a simple manner using the method according to the invention.

According to a further advantageous embodiment, the individual structural units of the end-system message and/or of the reference message are presented in a separate region of a screen display. This display can also contain, for example, details relating to the content of each of the structural units. In this context, the deviating and/or matching structural units are once again advantageously displayed in a graphically distinguishable manner.

In yet a further embodiment, each of the structural units presented is displayed with reference to its modular construction in such a manner that the connection between hierarchically superordinate and subordinate structural units and accordingly the entire hierarchical construction of a message is recognizable. The structural units of the message can be presented according to their modular construction, for example, by a respective indentation of subordinate structural units.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

One preferred exemplary embodiment of the method according to the invention is explained in greater detail below with reference to the drawings. The drawings are as follows.

DESCRIPTION OF THE PREFERRED EMBODIMENT

Before explaining in greater detail the method according to the invention for determining deviations of an end-system message of modular structure generated in a hierarchically-structured end system of a telecommunications device by comparison with a reference message, the construction of a message of modular structure will first be explained by way of example on the basis of FIGS. 1 and 2.

Figure 1:
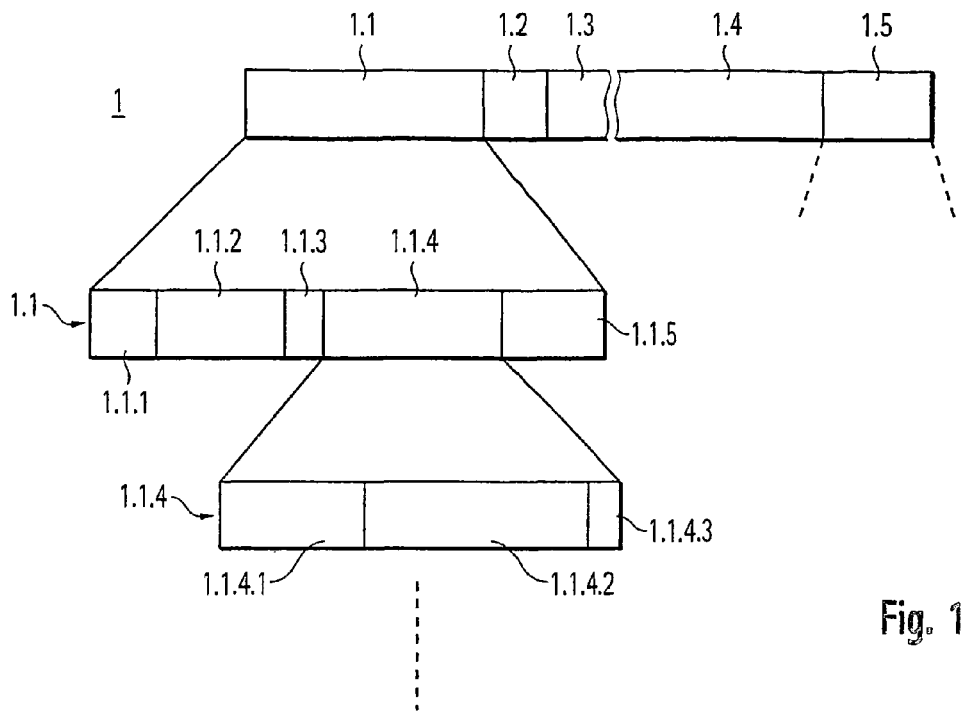
FIG. 1 shows a schematic presentation explaining the modular structure of messages.

FIG. 1 shows a message 1, such as may be used, for example, in providing a service through one of the layers according to the OSI reference model. The message 1 consists of several segments, which are indicated in FIG. 1 by the reference numbers 1.1, 1.2, 1.3, 1.4 and 1.5. A further subdivision into blocks 1.1.1, 1.1.2, 1.1.3, 1.1.4 and 1.1.5 is presented for the first segment 1.1. The other segments of the message 1 can also be subdivided into blocks of this kind. The individual blocks of the segment 1.1 can themselves be subdivided into smaller units 1.1.4.1, 1.1.4.2 and 1.1.4.3. The subdivision into smaller and smaller structural units as presented leads to a hierarchical system of message 1, which reflects its modular construction and/or its structure. The messages 1 represent, for example, elements of a data stream, which is exchanged between the various layers according to the OSI reference model of a base station or a mobile telephone station as the end system in a telecommunications device.

Figure 2:
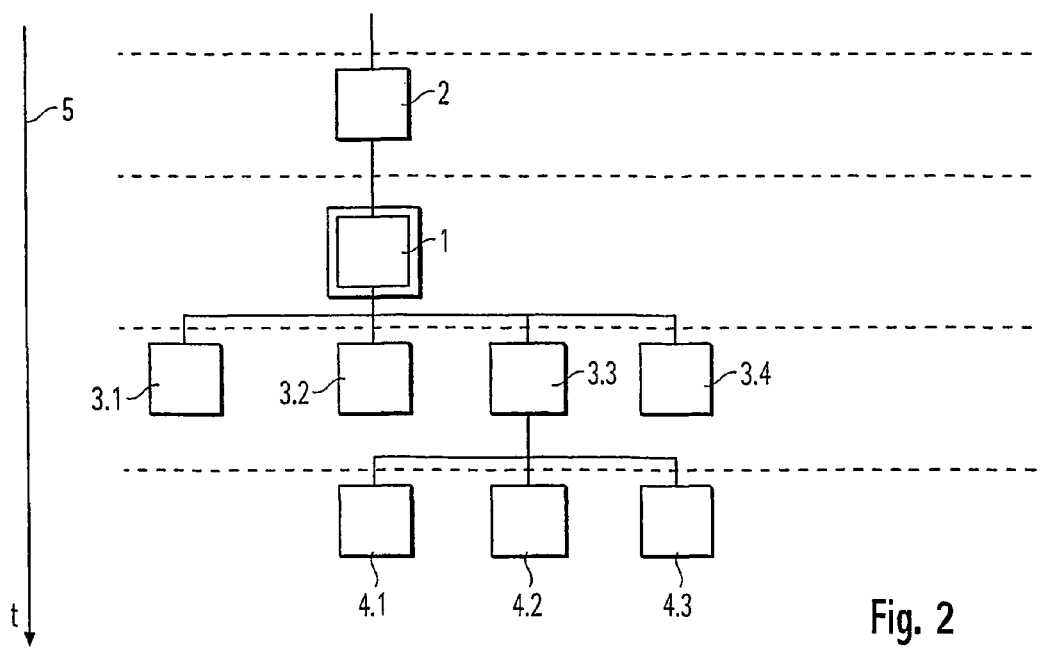
FIG. 2 shows a time sequence of several causally linked messages of an end system.

Starting from a given message 1, FIG. 2 shows a message flow through several generations. The message 1 is preceded by another message 2 of a parent generation. The message 1 has itself been triggered on the basis of the content of the other message 2 of the parent generation. As indicated by the connecting lines, the message 1 is once again the cause for the triggering of further messages 3.1, 3.2, 3.3 and 3.4, which belong to a children generation. The messages 3.1 to 3.4 of the children generation can, once again, themselves be responsible in a causative manner for the triggering of further messages 4.1, 4.2 and 4.3, as illustrated by way of example for the message 3.3 of the children generation. Each of the individual messages shown in FIG. 2 is structured in a modular manner according to the scheme presented in FIG. 1. In this context, an individual structural unit of a given type can, under some circumstances, be used in different hierarchical levels, that is to say, in segments 1.1 to 1.5 and also, for example, in blocks 1.1.1 to 1.1.5.

FIG. 2 illustrates the causal connection between several messages along a time axis 5. These messages can be recorded by means of a message analyzer, for example, for the analysis of a cellular mobile-telephone system.

Figure 3:
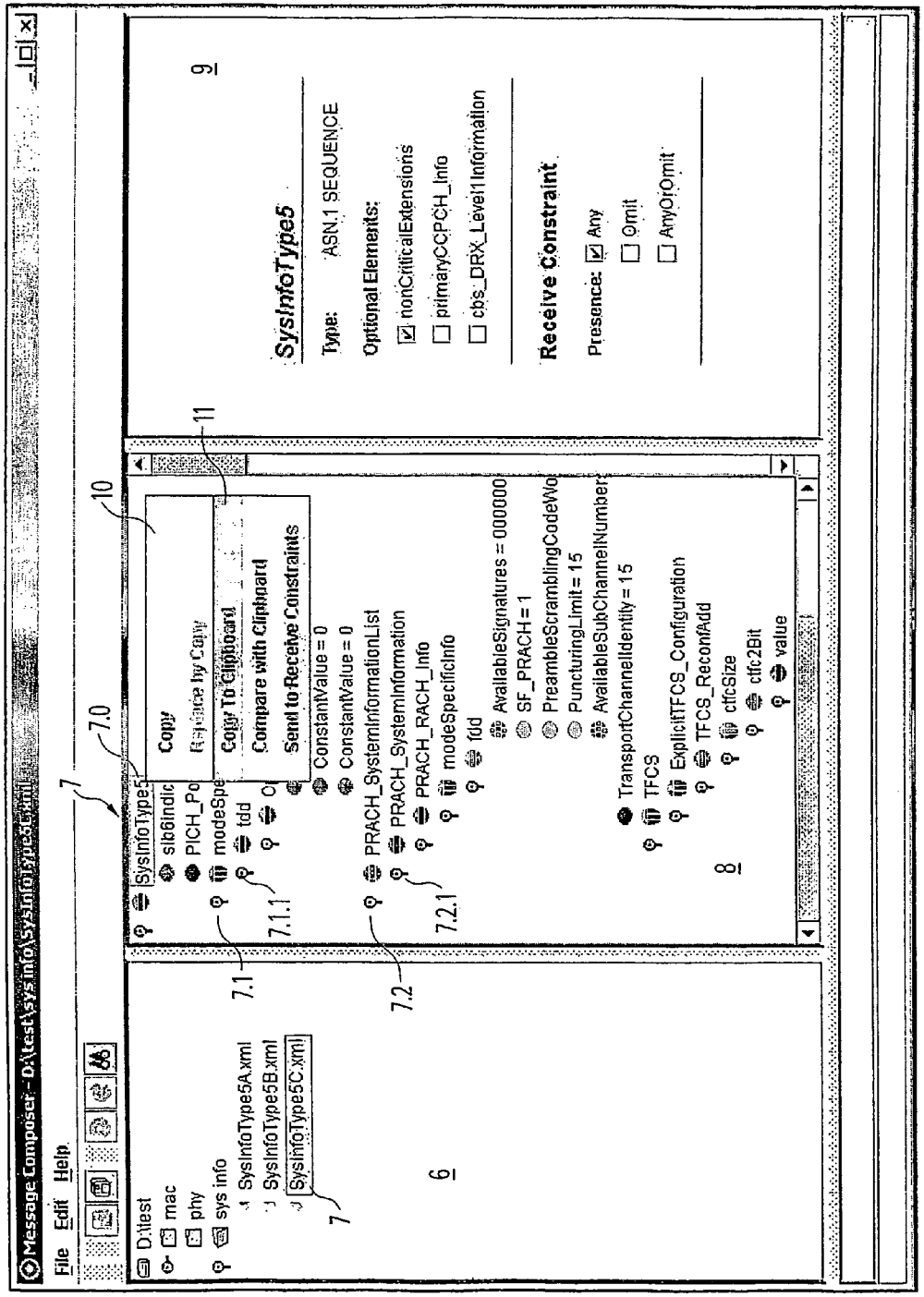
FIG. 3 shows an example of the obtaining of a reference message.

FIG. 3 shows how a reference message can be obtained, for example, using a message-generating device. For this purpose, a message 7 in a first region 6 of the screen display of the message-generating device is marked. This marking is implemented, for example, by clicking with an appropriate selection medium, for example, a computer mouse. The message 7 is selected by the message-generating device on the basis of the marking, and the entire structure of the selected message 7 is displayed in a second region 8 of the screen display.

This second region 8 presents the modular structure of the message 7 by displaying subordinate structural units in an indented manner. In FIG. 3, the structural units immediately subordinate to the uppermost structural unit 7.0 are marked with the reference numbers 7.1 and 7.2 and are indented by the same distance, to indicate that they belong to the same hierarchical level of the message 7. At the next lower hierarchical level, the two structural units 7.1 and 7.2 once again each comprise subordinate structural units 7.1.1 and respectively 7.2.1, which once again are displayed indented relative to their superordinate structural units 7.1 and 7.2 respectively.

The selection medium can be used to mark any structural unit, which is presented in the second region 8. The selection medium can, once again, be used to open a pull-down menu 10 for each marked structural unit: in the illustrated example, the uppermost structural unit 7.0. Various functions are listed in the pull-down menu 10, which can be implemented for the marked element selected by the message-generating device.

One of the functions presented is a copy function 11, by means of which the marked structural unit 7.0 including all subordinate structural units can be copied onto a clipboard. Using the clipboard, a message 7 taken from the message-generating device can therefore be made available for other applications. For example, the message 7 copied onto the clipboard can be used as a reference message for determining deviations of an end-system message sent within an end system, as described below in the context of a preferred exemplary embodiment of the method according to the invention. Moreover, further functions, by means of which the structural unit can be changed, are indicated for the marked structural unit 7.0 in a third region 9 of the screen display of the message-generating device.

Figure 4:
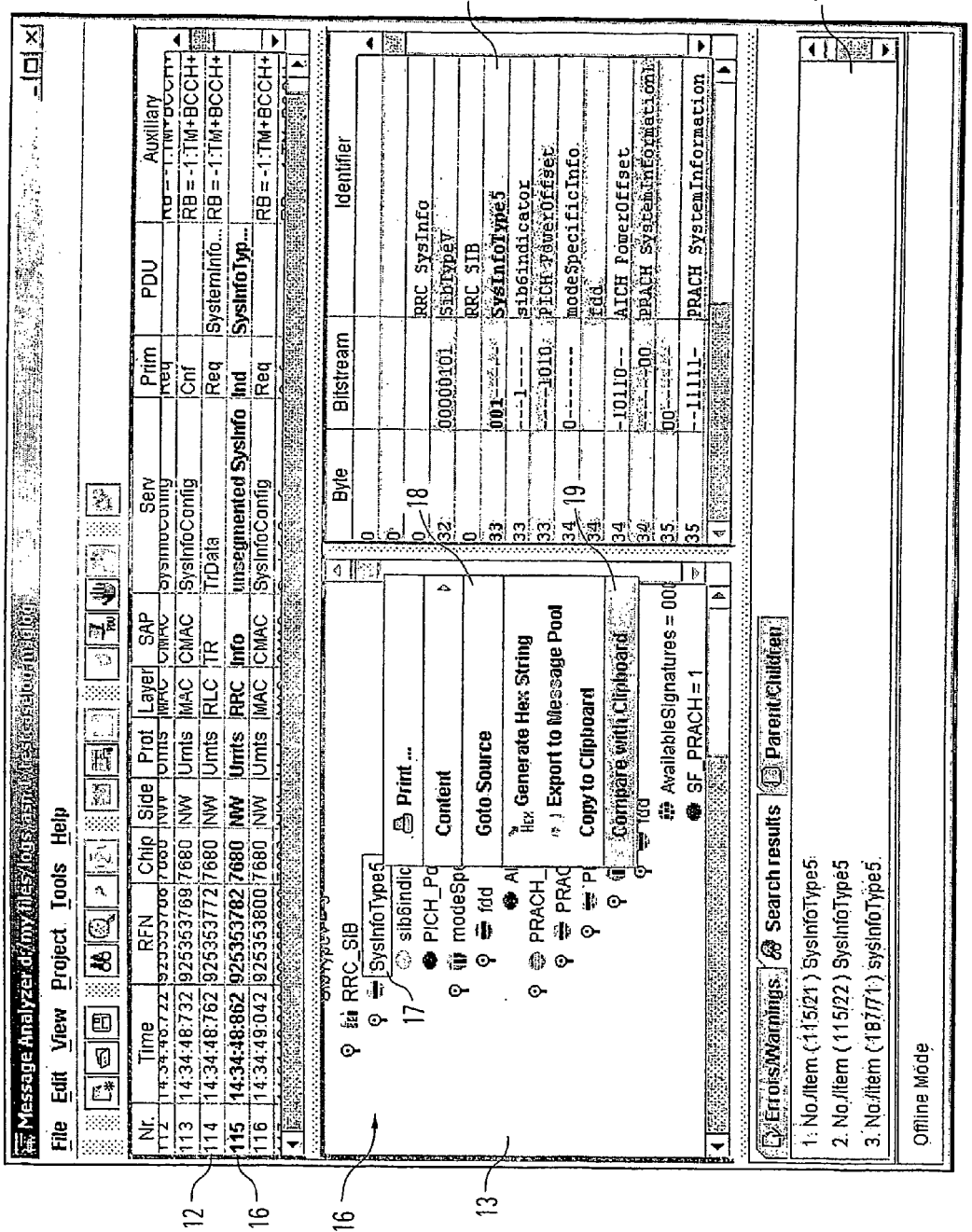
FIG. 4 shows an example of the obtaining of an end-system message.

After a reference message has been established by means of the copying function 11 of the message-generating device, a message sent from an end system, for example, during a test run, between the various layers according to the OSI reference model, is selected for analysis. Messages of this kind sent during a test run are logged, for example, in a so-called "log file", thereby providing a complete history of the messages sent by the end system. A message analyzer, of which the screen display is shown by way of example in FIG. 4, is used to evaluate messages of this kind.

The screen display of the message analyzer is subdivided into a first region 12, a second region 13, a third region 14 and a fourth region 15. In the first region 12, all the messages logged in the "log file" are listed according to their time-related generation by the end system. Within the first region 12, a message can once again be marked by means of the selection medium. This is illustrated for a message 16 with the serial number 115. The marked message 16 is selected by the message analyzer, and the structure of the modular construction of the message 16 is displayed in the second region 13. In this context, the display of the message 16 in the second region 13 corresponds in its construction to the display in the second region 8 of the message-generating device from FIG. 3.

Once again, any structural unit within the message displayed in the second region 13 can be marked, wherein the marked structural unit can also be the structural unit, which is arranged on the uppermost hierarchy level, thereby marking the complete message 16. In the exemplary embodiment illustrated, a structural unit 17, which forms a part of the entire end-system message 16, is marked. In the sense of the invention, such parts of a complete message also form an end-system message and/or a reference message.

The details for all of the structural units of the message 16 presented in the second region 13, are displayed in the third region 14 in the form of a table. In this context, the line in the table, which corresponds to the marked structural unit 17 is presented in bold type in the third region 14 to facilitate evaluation by a developer. Additional information, for example, regarding the relationship between the marked message 16 and a parent generation and/or children generations of messages, is presented in the fourth region 15.

Once again, a pull-down menu 18 can be opened for the structural unit 17 marked in the second region 13, which has been selected by the message analyzer. The pull-down menu 18 once again contains several functions, which can be applied to the marked structural unit 17. These can include, for example, a print function, an export function or a copy function for the clipboard. A compare function 19, with which the marked part of the end-system message 16 can be analyzed with regard to deviations from the reference message 7, which is already stored in the clipboard is additionally provided in the pull-down menu 18.

Figure 5:
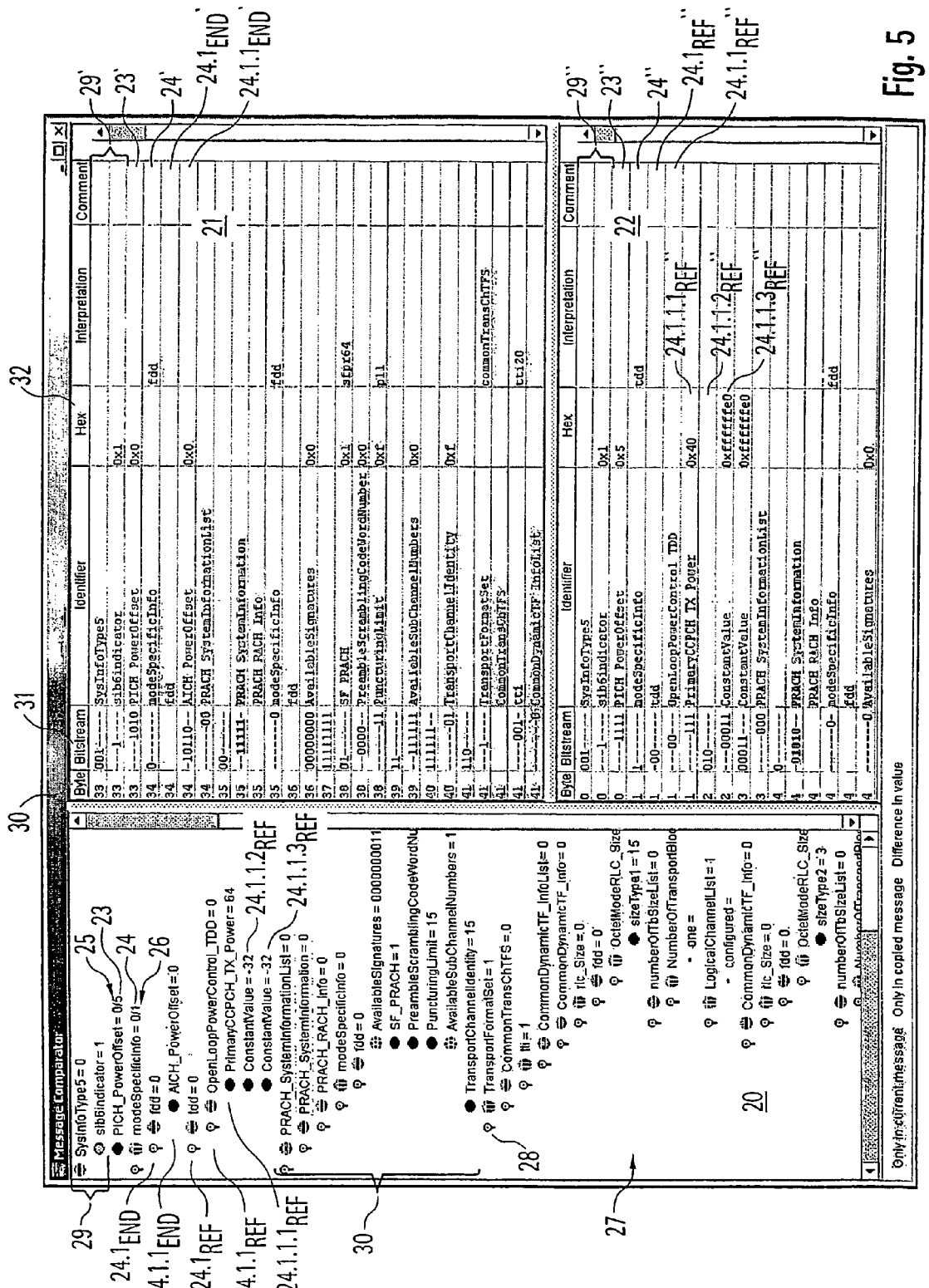
FIG. 5 shows a preferred display of the deviations determined in an end-system message.

If this compare function 19 is selected, the structure of the reference message 7 from the clipboard and also of the part of the end-system message 17 are both initially determined, thereby also establishing the modular construction of the two messages. The part of the end-system message is referred to below by way of abbreviation as the end-system message 17. The individual structural units of the two messages are then compared with one another, and deviations of the structural units of the end-system message 17 from the reference message 7 are displayed on screen, as illustrated by way of example in FIG. 5.

In the context of the exemplary embodiment illustrated, a deviation occurs in a first structural unit 23. In fact, this first structural unit 23 is present both in the reference message 7 and also in the end-system message 17; however, in each case, one parameter of the first structural unit 23 is defined with a different value. This deviation between the structural unit 23, as it occurs in the reference message 7 and respectively in the end-system message 17, is displayed in a first region 20.

Accordingly, the structural unit 23 is displayed and preferably highlighted in color. In addition to the presentation of the structural unit 23, the value, which is assigned to the parameter of the structural unit 23, is also displayed both for the reference message 7 and also for the end-system message 17. In the exemplary embodiment presented, the value for the end-system message 17 is "0" and the value for the reference message 7 is "5". Both values are displayed in the first region 20 and separated from one another by a forward slash, as indicated by the reference number 25.

A second structural unit 24 is also present both in the reference message 7 and also in the end-system message 17, but once again differs in a value assigned to the parameter of the second structural unit 24. The values "0" and "1" assigned to the parameter in the reference message 7 and the end-system message 7 respectively are once again presented in the first region 20 and separated from one another by a forward slash.

A further possibility for a structural unit of the end-system message 17 deviating from the reference message 7 is that the relevant structural unit is not present in the reference message 7. Such structural units present only in the end-system message 17 are indicated in the illustrated exemplary embodiment, for example, by the structural units $24.1_{END}$ and the subordinate structural unit $24.1.1_{END}$. Both structural units $24.1_{END}$ and $24.1.1_{END}$ are once again hierarchically subordinate to the structural unit 24 of the end-system message.

In order to facilitate an evaluation of the connection between the deviations of structural units of the end-system message 17 from the reference message 7, an indication in the first region 20 of those structural units of the end-system message 17, which are identical to the relevant structural units of the reference message 7 is also advantageous. This presentation in the first region 20 is preferably selected to correspond with the presentation in the second region 13 of the message analyzer in FIG. 4. Accordingly, the modular construction and the hierarchical structure of the end-system message 17 are displayed in the first region 20 by indentation of the hierarchically-subordinate structural units.

In the illustrated exemplary embodiment, further structural units 27 of the end-system message 17 are presented, which are present only in the end-system message 17, but not in the reference message 7. These structural units $24.1_{END}$, $24.1.1_{END}$ and 28, which are only present in the end-system message 17, with all of the structural units subordinate to the structural unit 28, are preferably also highlighted in color, using a color, which contrasts with the color presentations of both the first structural units 23 and the second structural units 24, and which also contrasts with the other structural units.

In the case of a presentation of the structural units indicated so far, the complete structure of the end-system message 17 with all structural units contained in it is presented in the first region 20. The first structural unit 23 and the second structural unit 24, which differ from the corresponding structural units of the reference message 7 only with regard to their content, are emphasized through the colored highlighting of the individual structural units. Moreover, those structural units $24.1_{END}$, $24.1.1_{END}$ and 27, which do not have a corresponding unit in the reference message 7, are highlighted with another color. To allow recognition of the context of these structural units, the other structural units of the end-system message 17 are additionally displayed, these other structural units 29 and 30 having a corresponding unit in the reference message 7 in an identical manner. This determination establishes the effects of changes to the end system of a telecommunications device on the messages sent within the end system.

Furthermore, it can occur, that structural units, which are present in the reference message 7, are not used in sending the end-system message 17 between the layers according to the OSI reference model. To indicate such an absence of structural units in the first region 20, these structural units are once again presented in the first region 20 in a manner distinguishable from all other structural units. In the illustrated exemplary embodiment, the structural unit $24.1_{REF}$ including its hierarchically subordinate structural units $24.1.1_{REF}$, $24.1.1.1_{REF}$, $24.1.1.2_{REF}$ and $24.1.1.3_{REF}$ are highlighted in a different color, in order to illustrate that they are exclusively present in the reference message 7. The display of these structural units $24.1_{REF}$, $24.1.1_{REF}$, $24.1.1.1_{REF}$, present only in the reference message 7, and their subordinate structural units $20.1.1.2_{REF}$ and $24.1.1.3_{REF}$ is provided at a position, which reflects the actual assignment of these structural units relative to the superordinate structural unit 24, which is also present in the reference message 7.

Alongside this presentation of the structure of the messages in the first region 20, a second region 21 is provided, in which the individual structural units of the end-system message 17 are listed in a table providing detailed information on each structural unit. For example, in order to indicate such details of the structural units, a first column 30 is provided for the byte within the message assigned to the relevant structural unit; a second column 31 is provided for the bit sequence; and a third column 32 for the value of a parameter in hexadecimal form. Further columns of the table can be provided to indicate the type of the structural unit, its interpretation or other supplementary comments.

A corresponding presentation of the structural units of the reference message 7 is also provided in the third region in the form of a table, in which the individual structural units are entered line by line. For the two identical structural units 29 present both in the end-system message 17 and also in the reference message 7, an entry in the lines 29' and respectively 29" is therefore provided both in the second region 21 and also in the third region 22. The entries in the lines 29' and 29" in this context are identical, with the exception of the indication of the bytes within the message. The different positioning within the message is a consequence of the fact that the reference message 7 used for the evaluation is a complete message, for which reason the first entry starts with byte number "0", but the end-system message 17 used is a part of a complete message, wherein the underlying first byte of the complete end-system message 17 is the byte with the number 33.

The structural units 23 and 24 present in both messages are reproduced in detail in the lines 23' and 23" and respectively 24' and 24". The respective difference of the first structural unit 23 and of the second structural unit 24, as already indicated in the first region 20 by the reference numbers 25 and 26 respectively, is also presented in the second region 21 and/or the third region 22. In this context, the first structural unit 23 differs, as indicated in line 23' and/or 23", in its hexadecimal value for the parameter indicated in the third column 32. By contrast, the second structural unit 24, differs, as shown in line 24' and/or 24", in the bit sequence, which is indicated in the second column 31.

For the structural units $24.1_{END}$ present only in the end-system message 17 and their subordinate structural unit $24.1.1_{END}$, the lines $24.1_{END'}$ and $20.1.1_{END'}$ are accordingly present only in the second region 21, in which only the structural units of the end-system message 17 are displayed. Conversely, the structural unit $24.1_{REF}$ with its subordinate structural units including the structural unit $24.1.1.3_{REF}$ are displayed in the corresponding lines $24.1_{REF''}$ to $20.1.1.3_{REF''}$ exclusively in the third region 22. Following the lines $24.1.1_{END'}$ in the second region 21 and/or the line $24.1.1.3_{REF''}$, the other identical structural units 30 present are displayed for the reference message 7 and also for the end-system message 17. An explicit indication is therefore omitted in FIG. 5 to allow an improved overview. A marking of the relevant structural units corresponding to the colored markings of the first region 28 is also provided in the second region 21 and the third region 22.

Other possibilities for graphic distinction can, of course, also be used instead of the colored markings provided by corresponding highlighting in the screen display, as explained in the preferred exemplary embodiment. Relevant examples include a cursive style, bold type or underlining or similar.

While the present invention has been described in connection with a number of embodiments and implementations, the present invention is not so limited but covers various obvious modifications and equivalent arrangements, which fall within the purview of the appended claims.

What is claimed is:

1. A method for determining deviations of a part of an end-system message of modular structure generated in a hierarchically-structured end system of a telecommunications device structured and based on an OSI reference model by comparison with a reference message comprising the steps of:

reading in a reference message, reading in an end-system message containing information of different layers according to the OSI reference model generated in the end system, performing a message-structure analysis of the reference message, performing a message-structure analysis of the generated end-system message, displaying both structural units of the reference message and structural units of the generated end-system message, selecting a displayed structural unit of the reference message, selecting a displayed structural unit of the end-system message, determining deviations of the selected structural unit of the end-system message by comparison with the selected structural unit of the reference message, after the respective selections of the respective structural units, based on a structure and values for parameters of structural units, and outputting of individual structural units of the selected structural unit of the end-system message deviating from the selected structural unit of the reference message indicating values of parameters of the respective individual structural units of the selected structural unit of the end-system message generated in the end system in a first region of a screen display, wherein, in a second area of the screen display, the structural units of the end-system message are shown giving details for all structural units of the end-system message in the form of a table, and, in a third area of the screen display, the structural units of the reference message are shown giving details for all structural units of the end-system message in the form of a table, and wherein, in the second area and the third area, in each case the byte assigned to a structural unit within the end-system message or the reference message respectively is given.

2. A method according to claim 1, wherein:

identical structural units of the reference message and of the end-system message generated in the end system are output, wherein the structural units of the end-system message deviating from the reference message are output in a manner graphically distinguishable from the identical structural units.

3. A method according to claim 1, wherein:

structural units only present in the reference message are output in a manner graphically distinguishable from structural units other than the structural units only present in the reference message.

4. A method according to claim 1, wherein:
structural units only present in the generated end-system message are output in a manner graphically distinguishable from structural units other than the structural units only present in the generated end-system message.

5. A method according to claim 1, wherein:
the structural units at least of the end-system message are output in a manner corresponding to a modular construction.

6. A method according to claim 1, wherein:
the structural units of the end-system message are output in a second region with an indication of information regarding a data stream of the end-system message, wherein structural units deviating from the reference message are output in a manner distinguishable from structural units of the second region other than the structural units deviating from the reference message.

7. A method according to claim 1, wherein:
structural units of the reference message are output in a third region with an indication of information of a data stream of the reference message, wherein structural units deviating from the end-system message are output in a manner distinguishable from structural units of the third region other than the structural units deviating from the end-system message.

8. Digital non-transitory storage medium with electronically-readable control signals, configured to co-operate with a programmable computer or digital signal processor in such a manner that the method according to claim 1 is implemented.

9. Computer software product with program-code means stored on a non-transitory machine-readable data carrier, for the implementation of the method according to claim 1, when the software is run on a computer or a digital signal processor.

\* \* \* \* \*